May 20, 1958     I. M. HOLSTEIN     2,835,542

POSITIVE WEDGE SEALING PISTON AND SLEEVE

Filed Jan. 9, 1956

Ivan M. Holstein
INVENTOR.

BY *Clarence A. O'Brien*
*and Harvey B. Jacobson*
Attorneys

United States Patent Office 2,835,542
Patented May 20, 1958

2,835,542

POSITIVE WEDGE SEALING PISTON AND SLEEVE

Ivan M. Holstein, East Hartford, Conn.

Application January 9, 1956, Serial No. 558,039

7 Claims. (Cl. 309—7)

This invention comprises novel and useful improvements in a positive wedge sealing piston ring and sleeve and more particularly relates to an improved piston and ring construction specifically adapted for use in environments wherein the rings and pistons are subjected to a pulsating pressure such as with internal combustion engines and the like.

The principal object of this invention is to provide a piston ring construction wherein fluid pressure on either side of the ring assembly will effect a wedging action thereby expanding the ring against the cylinder wall and improving its sealing engagement therewith.

A further object of the invention is to provide a piston ring construction whereby the wedge action piston ring assembly may be applied directly to the cylindrical circumference of a piston or may be carried by a sleeve or liner mounted upon the exterior surface of the piston.

A further important object of the invention is to provide an improved piston and piston ring construction in accordance with the foregoing objects which shall be effective for very effectively controlling fluid pressures either above or below the ring and sleeve assembly, and which shall also be effective as an oil wiper ring for a cylinder and piston.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
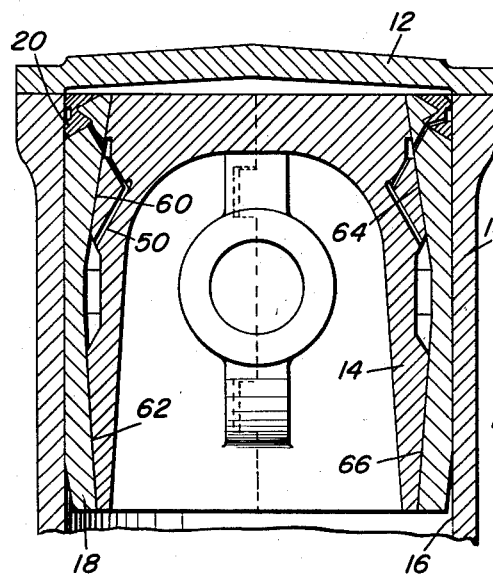
Figure 1 is a view in vertical central section through a portion of a cylinder showing a piston therein having the sealing ring and sleeve assembly in accordance with this invention applied thereto.
Figure 4:
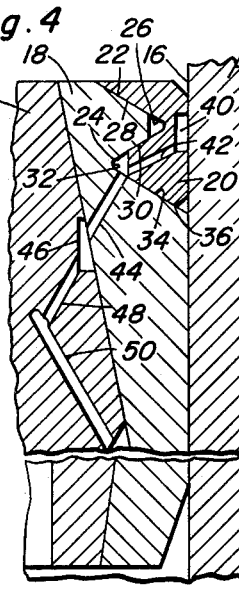
Figure 5:
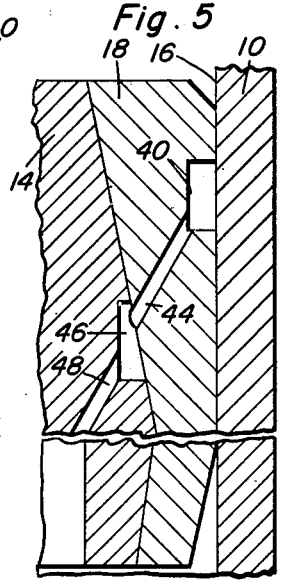

Figure 4 is an enlarged detailed view of the upper right hand portion of the piston and sealing ring assembly of Figure 1, parts being broken away, and of the lower portion of the piston ring carrying sleeve of the invention; and, Figure 5 is a view similar to Figure 4 but showing a modified construction in which the ring assembly is omitted and the sleeve itself forms the sealing member for the piston and cylinder.

The sealing ring construction set forth hereinafter, although not limited thereto, is especially adapted for use with the cylinders and pistons of internal combustion engines and other constructions in which the sealing ring assembly is exposed to pulsating pressures. In the embodiment illustrated in the accompanying drawings as an exemplification of one satisfactory manner of practicing the improvement of this invention, there is disclosed at 10 a portion of the cylinder of an internal combustion engine or other similar device, and which may be closed at one end as by a detachable head 12 and in which is slidably received a piston 14. The sealing assembly in accordance with this invention is interposed operatively between the piston 14 and the wall 16 of the cylinder 10 for establishing a sealing engagement therewith.

In a preferred embodiment, this sealing construction includes a sleeve or liner of a generally cylindrical nature and indicated generally by the numeral 18. The liner has a cylindrical outer surface which has sliding engagement with the wall 16 of the cylinder 10.

Referring now especially to Figure 4, it will be seen that the upper portion of the external surface of the liner 18 is provided with and carries a sealing ring 20. For this purpose, the liner or sleeve is provided with a pair of circumferentially extending annular wedging surfaces 22 and 24 which are oppositely inclined. The sealing ring 20 is provided with a V-shaped notch or annular circumferentially extending groove 26 which likewise is provided with a pair of oppositely inclined annular wedging surfaces 28 and 30 which are respectively complementary to and operatively engage the previously mentioned wedging surfaces 22 and 24 formed upon the sleeve. It will be further apparent from Figure 4 that the sleeve is provided with a V-shaped groove extending circumferentially thereof and indicated by the numeral 32. One wall of this groove is formed by the wedging surface 30 while the other wall thereof forms the annular wedging surface 34, which is engaged by the complementary wedging surface 36 formed upon the sealing ring.

It will thus be observed that there are provided three wedging surfaces upon each of the sleeves and the sealing ring, and each of these members has a V-shaped annular groove which cooperates with two of the wedging surfaces of the other member.

At this point it should be observed that the top surfaces of the sealing ring and of the sleeve are directly exposed to the fluid pressure to which the top surface of the piston are subjected. Further, the degree of inclination of the various wedging surfaces can be so selected that the fluid pressure to which the top surface of the sealing ring is subjected, whether negative or positive, as upon the suction stroke, exhaust, compression or power strokes respectively of an internal combustion engine piston, will be effective for applying either an upward or downward thrust to the sealing ring and thus to engagement of the cooperating wedging surfaces will impart a radial thrust to the sealing ring to urge the same outwardly against the wall 16 of the cylinder 10 to establish a sealing engagement therewith.

More specifically, it will be observed that a relatively greater than atmospheric pressure applied to the top surface of the sealing ring will urge the latter downwardly and thus through cooperation of the pair of complementary wedging surfaces 22 of the sleeve and 28 of the ring and the further surfaces 34 of the sleeve and 36 of of the ring will radially expand the latter into sealing engagement with the cylinder wall 16.

When a negative or subatmospheric pressure is applied to the top surface of the sealing ring, it will be observed that the ring will be urged upwardly causing a wedging engagement of the complementary surfaces 24 of the sleeve and 30 of the ring to again urge the ring radially outwardly into sealing engagement with the cylinder wall 16.

By this means, the pulsating pressures to which the head of the piston is subjected will be effective to radially expand the sealing ring against the cylinder wall and improve the sealing engagement therebetween.

The sealing ring is provided with a circumferentially extending oil groove or channel 40 having a passage 42 communicating therewith and extending through the sealing ring into the previously mentioned groove 32 in the sleeve. A further drainage channel 44 extends through the sleeve and communicates the groove 32 with a circumferential oil drainage channel 46 which extends circumferentially about the piston. Further communicating drainage passages 48 and 50 deliver the oil collected from the groove 40 to the interior of the piston and cylinder. The upper edge of the oil groove 40 provides a wiper whereby oil will be wiped from the wall of the cylinder and thus reducing the consumption of oil of the device in which this sealing ring construction is embodied.

Referring again more specifically to Figures 1, 2, 4 and 5, it will be observed that the exterior surface of the piston is provided with oppositely inclined annular wedging surfaces 60 and 62. The interior surface of the sleeve is likewise provided with oppositely inclined wedging surfaces 64 and 66 which respectively engage and cooperate with the surfaces 60 and 62. These oppositely inclined sets of complementary wedging surfaces likewise serve upon the imposition of an axial thrust to the end of the sleeve, by either a positive or negative pressure applied to the same, to cause radial expansion of the sleeve against the cylinder wall. In some instances, as in Figure 5, this expansion of the sleeve may be sufficient to establish the desired sealing engagement with the cylinder wall whereby the provision of the sealing ring and the wedging surfaces of the same, previously mentioned, will be unnecessary. In that instance, however, as shown in Figure 5, the same oil drainage passage previously mentioned will be employed.

Figure 3:
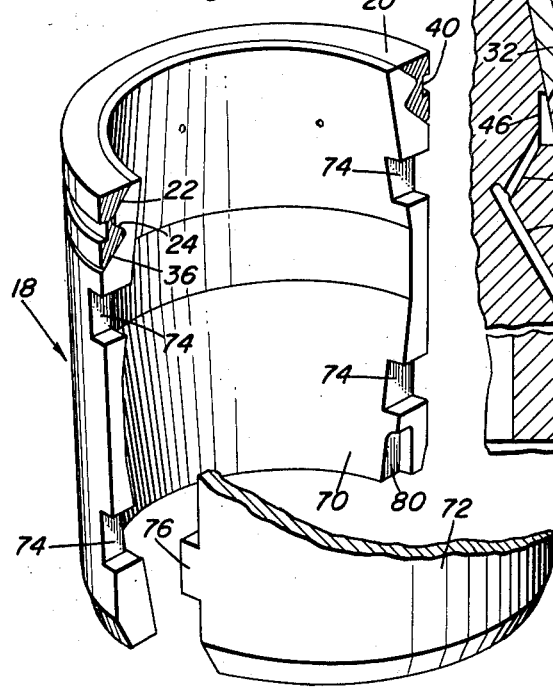
Figure 3 is a group perspective view, parts being broken away, showing the two complementary sleeve sections upon which the improved piston ring assembly is mounted.

In order to facilitate the application of the sleeve to the piston, it is preferred to form the sleeve 18 as two or more semi-cylindrical sections, as indicated at 70 and 72 in Figure 3. The adjacent edges of these sections are provided with mating notches 74 and projections or tongues 76 whereby when the two sections are applied to the exterior surface of a piston, they will be locked against relative axial displacement with respect to each other.

It is to be understood that in some instances the cooperative complementary wedging surfaces may be applied directly between a piston ring and the surface of a cylinder, with the sleeve being omitted therefrom.

Figure 2:
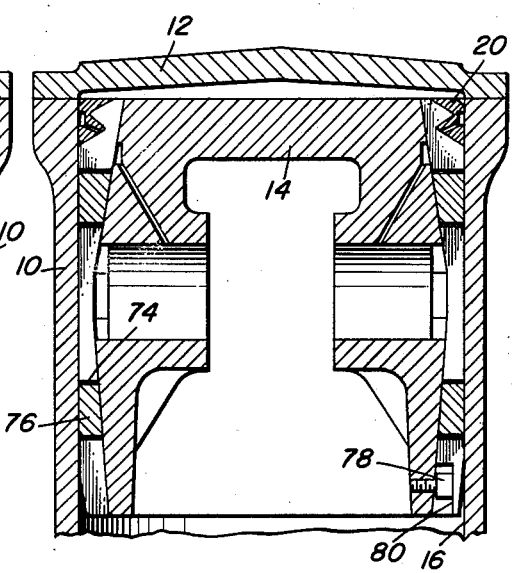
Figure 2 is a view similar to Figure 1 but taken at ring angles thereto.

By means of a pin 78 projecting laterally from the piston 14 which is slidably received in the vertically extending recess 80 of the sleeve 18, see Figures 2 and 3, rotation of the sleeve 18 relative to the piston is prevented, thus avoiding the possibility of the parting line of the sleeve being disposed in the position of the thrust faces.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. A piston sealing construction comprising a piston body having upon the upper and lower portions respectively of its external surface upwardly and downwardly convergent conical tapered surfaces, a sleeve comprising a pair of semi-cylindrical sections mounted upon and embracing said piston, said sleeve having upon the upper and lower portions respectively of its internal surface upwardly and downwardly convergent conical tapered surfaces complementary with those on the piston, a circumferentially extending sealing ring mounted upon the exterior of said sleeve.

2. The combination of claim 1 including an oil control groove in the exterior surface of said sealing ring, oil drainage channels in said sleeve and piston communicating with said oil control groove.

3. The combination of claim 1 including a further pair of inclined complementary annular wedging surfaces on said sleeve and sealing ring operative to impart by wedging action a radial outward thrust to said sealing ring.

4. The combination of claim 1 including means effecting locking of adjacent edges of said sections to each other against relative axial movement.

5. The combination of claim 1 including means preventing rotation of the sleeve upon said piston.

6. The combination of claim 1 including a circumferential groove on the exterior of said sleeve having inclined walls to provide a pair of wedging surfaces, said sleeve having a third annular wedging surface, a sealing ring having a peripheral groove whose side walls are complementary to said third wedging surface and to the adjacent one of said pair of wedging surfaces, said ring having a third wedging surface which is complementary to the other one of said pair of wedging surfaces, on the sleeve.

7. The combination of claim 6 including communicating oil control passages in said piston, said sleeve and said ring.

References Cited in the file of this patent

UNITED STATES PATENTS

| | | |
|---|---|---|
| 1,392,035 | Williams | Sept. 27, 1921 |
| 1,424,200 | Johnston | Aug. 1, 1922 |
| 1,443,473 | Huhn | Jan. 30, 1923 |
| 1,652,385 | Walker | Dec. 13, 1927 |
| 2,257,236 | Hayden | Sept. 30, 1941 |
| 2,261,405 | Nicolle | Nov. 4, 1941 |
| 2,390,586 | Hastings | Dec. 11, 1945 |

FOREIGN PATENTS

| | | |
|---|---|---|
| 332,368 | Great Britain | July 24, 1930 |